United States Patent Office 3,536,812
Patented Oct. 27, 1970

1

3,536,812
NEMATOCIDAL USE OF ALLYLIC
DITHIOPHOSPHATES
Alexis A. Oswald, Mountainside, and Karl Griesbaum, Elizabeth, N.J., assignors to Esso Research and Engineering Company, a corporation of Delaware
No Drawing. Continuation-in-part of application Ser. No. 312,302, Sept. 30, 1963. This application July 13, 1967, Ser. No. 653,044
Int. Cl. A01n 9/36
U.S. Cl. 424—219               6 Claims

ABSTRACT OF THE DISCLOSURE

Allylic dihydrocarbyl dithiophosphates are useful as nontoxic pesticides; these compounds may be prepared by various methods, e.g., free radical or cationic addition of dihydrocarbyl dithiophosphoric acids to dienes.

CROSS-REFERENCE

This application is a continuation-in-part of copending application Ser. No. 312,302 filed in the U.S. Patent Office Sept. 30, 1963, now Pat. No. 3,334,332.

FIELD OF INVENTION

This invention relates to the uses of a novel class of organo phosphorus compounds. More particularly, this invention relates to the use, as pesticides and lubricating oil additives, of allylic phosphorus compounds having the generic formula:

(I)
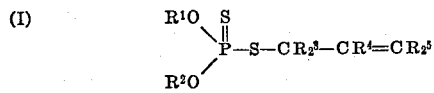

wherein $R^1$ and $R^2$ are each $C_1$–$C_{30}$ hydrocarbon radicals, e.g., alkyl, alkenyl, aryl, alkaryl, aralkyl, etc., and $R^3$–$R^5$ are each hydrogen, halogen, e.g. chlorine, bromine, fluorine, or $C_1$–$C_{18}$ hydrocarbon radicals, e.g., alkyl, aryl, etc. Still more particularly, and in a further embodiment, this invention relates to crotylic phosphorus compounds having the generic formula:

(II)
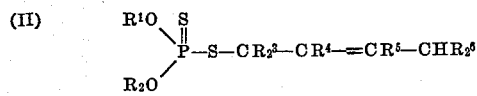

wherein $R^1$–$R^5$ are as defined above for Formula I and $R^6$ can be hydrogen or a $C_1$–$C_8$ hydrocarbon radical.

PRIOR ART

The addition of O,O'-dihydrocarbyl dithiophosphoric acids to unsaturated compounds is known to produce esters of dithiophosphoric acid (Houben-Weil, Methoden der Organischen Chemie, vol. XII/2, Organische Phosphor-Verbindungen, pp. 709–720, Ed. E. Mueller, Publ. G Thieme Verlag, Stuttgart, Germany, 1964). Some of these compounds possess properties which make them suitable as agricultural chemicals, e.g., pesticides, fungicides, insecticides, and lubricating oil additives. The importance of selected members of this group has stimulated interest in other organophosphorus compounds which may possess comparable properties, e.g., U.S. Pat. 3,153,664. However, a disadvantage of many dithiophosphate esters is that they are rather toxic to warm blooded animals and, consequently, their use as pesticides has been restricted. Nevertheless, the compounds disclosed herein have been found to be highly effective for various pesticidal applications while exhibiting little, if any, toxicity towards warm blooded animals.

The compounds of this invention are also quite useful as lubricating oil additives. While dithiophosphate esters of various classes have been known as oil additives, the allylic esters disclosed herein have exhibited some rather unexpected advantages. Thus, allylic esters are generally hydrolytically and otherwise unstable and as such, are not normally desirable components in lubricating oil compositions. In contrast, however, the allylic dithiophosphates that are the subject of this invention, exhibit the proper stability in lubricating oil compositions and exhibit properties that are superior to many known additives.

SUMMARY OF THE INVENTION

In accordance with this invention, therefore, novel allylic and crotylic dithiophosphates having the structural formulae depicted in (I) and (II) above, are employed as pesticides, particularly nematocides, and lubricating oil additives. Of course, depending upon the ultimate use which the compounds are put, various other structures, within the generic structure set forth above, will be preferred. Accordingly, then, as pestcides $R^1$ and $R^2$ are preferably $C_1$–$C_{14}$ open chain aliphatic or aromatic hydrocarbon radicals, more preferably $C_1$–$C_8$ aliphatic hydrocarbons, and still more preferably, for nematocidal use $C_1$–$C_2$ alkyl radicals; as lubricating oil additives, however, $R^1$ and $R^2$ are preferably $C_3$–$C_{30}$ hydrocarbon radicals. $R^3$–$R^5$, in Formula I, are preferably hydrogen, $C_1$–$C_8$ alkyl radicals (more preferably $C_1$–$C_6$ alkyl), or halogen, particularly chlorine. $R^6$ in Formula II is preferably hydrogen or a $C_1$–$C_6$ alkyl radical. Thus, preferred compounds for use as pesticides or lubricating oil additives may be depicted by the following structural formulae;

(III)
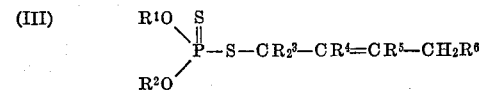

wherein $R^1$ and $R^2$ are selected from the group consisting of $C_1$–$C_{30}$ alkyl, $C_1$–$C_{30}$ alkenyl, and $C_6$–$C_{14}$ aryl; and $R^3$–$R^6$ are selected from the group consisting of hydrogen, $C_1$–$C_6$ alkyl, and chlorine; and (IV)
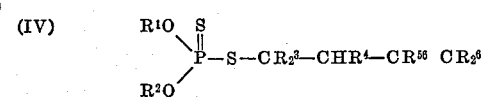

wherein $R^1$ and $R^2$ are as defined for Formula III; $R^3$–$R^5$ are selected from the group consisting of hydrogen, $C_1$–$C_6$ alkyl and chlorine, and $R^6$ is a $C_1$–$C_6$ alkyl group.

A particularly attractive property of the allylic dithiophosphates is their high level of activity against soil borne insects and nematodes. For example, these compounds were found to be quite effective against the larvae of the cabbage worm, corn rootworm, and the root knot nematodes. Allylic dithiophosphates which were found to be particularly effective in this respect were those wherein $R^1$ and $R^2$ were methyl and ethyl, particularly methyl, and $R^3$–$R^6$ were either methyl ethyl, hydrogen or halogen, e.g., chlorine, particularly methyl and halogen. Such compounds may be depicted by the following generic formula:

IV
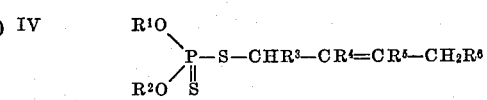

wherein $R^1$ and $R^2$ are each selected from the group consisting of methyl and ethyl radicals and $R^3$–$R^6$ are each selected from the group consisting of hydrogen, chlorine, methyl and ethyl radicals. Some typical examples of compounds having the structure depicted by Formula III are:

S—allyl dimethyl dithiophosphate
S—allyl diethyl dithiophosphate
S—crotyl dimethyl dithiophosphate S—crotyl diethyl dithiophosphate
S—α-methallyl diethyl dithiophosphate
S—β-methallyl dimethyl dithiophosphate
S—β-chloroallyl dimethyl dithiophosphate
S—2-pentenyl dimethyl dithiophosphate
S—(α-methyl) crotyl dimethyl dithiophosphate
S—(β-methyl) crotyl dimethyl dithiophosphate
S—β-chlorocrotyl dimethyl dithiophosphate
S—β-bromocrotyl diethyl dithiophosphate
S—2-(2,3-dimethyl)-butenyl dimethyl dithiophosphate
S—β,γ-dichlorocrotyl dimethyl dithiophosphate The use of the allylic dithiophosphates as lubricating oil is also a particularly advantageous feature of this invention. While not wishing to be bound by any particular theory, it is believed that the stability of these compounds in lubricating compositions is due to the interaction of the olefinic double bond of the dithiophosphates with metals, sulfur and their compounds during use. Additionally, the use of chlorine substitution on the vinylic carbon atoms of the allyl dithiophosphates enhances the lubricating activity of these compounds. Thus, beta and gamma chloroallyl dithiophosphate compounds, in contrast to other chlorinated oil additives, do not adversely effect the corrosivity of oil compositions toward metals and alloys.

Of particular interest as oil additives are the allylic dithiophosphates of medium molecular weight, e.g., those wherein $R^1$ and $R^2$ are $C_3$–$C_{30}$ hydrocarbon radicals and $R^3$–$R^6$ are hydrogen, $C_1$–$C_{18}$ hydrocarbon radicals or chlorine. Of these, compounds having the following generic formulae were of most particular interest:

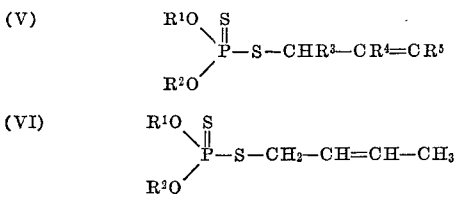

(V)

(VI)

wherein $R^1$, $R^2$, $R^3$–$R^6$ are as just described. Some typical examples of compounds having these structural formulae are:

S—allyl-di-i-propyl dithiophosphate
S—crotyl di-i-propyl dithiophosphate
S—crotyl di-n-propyl dithiophosphate
S—crotyl di-n-butyl dithiophosphate
S—crotyl di-n-amyl dithiophosphate
S—crotyl di-n-dodecyl dithiophosphate
S—crotyl diphenyl dithiophosphate
S—crotyl di-p-nonyl phenyl dithiophosphate
S—β-methallyl di-i-octyl dithiophosphate
S—β-chlorocrotyl di-i-propyl dithiophosphate
S—β,γ-dichlorocrotyl-di-n-hexyl dithiophosphate
S—2-pentenyl di-i-propyl dithiophosphate The novel composition of matter of the present invention is particularly useful as an additive to hydrocarbon oil and still more particularly to lubricating oil. In the latter oil, the compound serves a number of important functions such as oxidation inhibitor (peroxide decomposer), bearing corrosion inhibitor, ring anti-plugging additive, extreme pressure additive, anti-friction additive, pour point depressant, viscosity index improver, detergent, etc.

The lubricating oil may be straight mineral lubricating oil derived from paraffinic, naphthenic, asphaltic or mixed base petroleum crudes or blends thereof and is generally highly refined. In another embodiment the lubricating oil is a synthetic lubricating oil and may be one or a mixture of various types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethyl glutarate, di-3,5,5-trimethylpentyl glutarate, di-(2-ethylhexyl) pimelate, di-(2-ethylhexyl) adipate, triamyl tricaballylate, pentaerythritol tetracaproate, dipropylene glycol dipelargonate, 1,5-pentanediol-di-(2-ethylhexanoate), etc. The polyalkylene oxides and derivatives include polyisopropylene oxide, polyisopropylene oxide diether, polyisopropylene oxide diester, etc. The silicones includes methyl silicone, methylphenyl silicone, etc., and the silicates include, for example, tetraisooctyl silicate, etc. Synthetic lubricants proposed for use in high temperature service as, for example, jet fuel lubrication, are pentaerythritol esters and trimethylol propane esters.

The novel composition of the present invention also is useful as an additive to lubricating greases. These may be either of synthetic or petroleum origin.

The compounds of this invention are most advantageously prepared by the addition of the corresponding dihydrocarbyl dithiophosphoric acids to conjugated dienes or allene. Such additions are fully described in the above mentioned S.N. 312,302 (free radical type addition) and in copending application S.N. 640,355, filed May 22, 1967 (cationic type addition) which are incorporated herein by reference.

Briefly, however, the preparation of these compounds is effected by reacting a dihydrocarbyl dithiophosphoric acid having the generic formula:

(VII) 

wherein $R^1$ and $R^2$ are as previously described, with a diene selected from the group consisting of allene and $C_4$–$C_{30}$ conjugated diolefins. The dienes applicable to this invention are preferably open chain and are most preferably $C_4$–$C_{10}$ compounds, e.g., butadiene, isoprene, chloroprene, 2,3-dimethyl butadiene, 2,3-dichlorobutadiene, 2,5-dimethylhexadiene, 2–4, and the like.

An interesting advantage in preparing these compounds by the methods disclosed herein is that the resulting product is predominantly a single isomer of the mono addition product, rather than a smear of products, including diadducts, as might be expected when a compound having more than one olefinic double bond, particularly a conjugated double bond, is reacted.

Free radical addition can be conducted over a wide range of temperatures, e.g., −80° to 100° C., and may be effected without a catalyst, although free radical initiators, e.g., peroxidic or azo compounds, ultraviolet light, gamma irradiation, are preferred. Preferably, equimolar amounts of the reactants are employed, however, the reaction can be conducted with a 10% to 200% excess of either reactant and similar results will be obtained.

Cationic addition is a liquid phase reaction which occurs in an acidic medium. While the lower dialkyl dithiophosphoric acids are sometimes acidic enough to promote the reaction, it is preferred to employ a cationic catalyst, e.g., an acid with a pKa greater than the dithiophosphoric acid, for example, mineral acids, Friedel-Crafts catalysts, various organic acids such as trichloroacetic, sulfonic acids, perchloric, etc. Temperatures may again vary widely, e.g., −80° to 150° C., and molar ratios are not critical, e.g., 1:5 to 5:1, although an excess dithiophosporic acid is preferred to drive the reaction to completion, e.g., 1:1 to 5:1, more preferably 2:1 to 5:1.

In either reaction mechanism pressures are not critical and may be subatmospheric, e.g., 0.5 atm., or super atmospheric, e.g., 70 atm., while atmospheric pressure is normally to be preferred. Again, in either mechanism, solvents may be employed, such solvents being those that are generally inert to the reactants, e.g., ethers, $C_6$–$C_{12}$ aromatics, and the like. Generally, the reaction is conducted for a period of time sufficient to form a substantial amount of the mono addition product, e.g., 10 min. to 100 hours. The desired product can then be recovered by known methods, e.g., fractional distillation, preferably under vacuum.

It should be noted that when allene is the diene reactant, it is essential to utilize a free radical addition mechanism. Thus, the 1,2-mono addition product, i.e.,

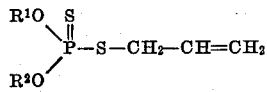

can be selectively formed in yields in excess of 75%. This is indeed surprising in view of the fact that the di-addition product is also capable of forming. Additionally, an excess of allene is essential, e.g., 2:1 to 5:1 of allene/ acid molar ratio, in order to achieve the high selectivity.

The pesticidal compositions of this invention may be employed in either solid or liquid form. When used as a solid, the allylic dithiophosphates may be reduced to an impalpable powder and applied as an undiluted dust or mixed with a solid, inert carrier such as clay, talc, bentonite, diatomaceous earth, sawdust, calcium carbonate and other carriers well known to the art. The pesticidal compositions can also be applied as a spray in a liquid carrier either as a solution in a solvent, e.g., organic compounds such as acetone, ethyl alcohol, benzene, naphtha, kerosene, and the like, as a suspension or dispersion in a nonsolvent, e.g., water, or as an emulsion with suitable emulsifying and wetting agents. Emulsifying and wetting agents, also known as surface active agents, are exemplified by alkali metal higher alkyl aryl sulfonates, e.g., sodium dodecylbenzene sulfonate; sulfates of long chain alcohols, e.g., dodecanol, octadecanol; sulfonated amide and ester derivatives; esters of fatty acids, e.g., ricinoleic ester of sorbitol; petroleum sulfonates of $C_{10}$–$C_{20}$ nonionic emulsifying agents, e.g., ethylene oxide condensation products of alkylated phenols; and the like. These compounds may also be employed undiluted as an atomized spray or mist. In the diluted form, however, the compounds are normally employed in amounts ranging from about 0.01 to 5.0 wt. percent based on the carrier. The proportions of the various other materials that are normally employed in pesticidal compositions are not critical and will be well known to those skilled in the art. Additionally, the active compounds of this invention may also be admixed with carriers that are themselves pesticides. When utilized in nematocidal applications, the active compound by itself or admixed with a carrier, can be applied either to the soil habitat of the nematodes or directly to the vegetation sought to be protected, preferably, however, to the soil habitat.

FREE RADICAL SYNTHESIS

Example 1

0.25 mole of O,O'-diethyldithiophosphoric acid was mixed with 0.25 mole of 1,3-butadiene in a closed 100 ml. round bottom flask equipped with a magnetic stirrer. The reaction temperature was maintained at room temperature (approximately 25° C.) for a period of eight hours and the reaction was catalyzed with ultraviolet light. Analysis of the product by gas chromatography and nuclear magnetic resonance spectroscopy indicate that 9.4 wt. percent of the reaction product was O,O'-diethyl-S-2-buten-1-yl dithiophosphate which may be represented structurally by the following formula:

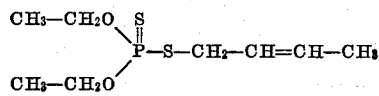

The product could be readily purified by fractional distillation in vacuo. It distilled over as a colorless liquid between 75–76° C. at 1 mm. pressure.

*Analysis.*—Calcd. for $C_8H_{17}O_2PS_2$ (percent): C, 39.99; H, 7.13; P, 12.88; S, 26.69. Found (percent): C, 40.08; H, 7.37; P, 12.52; S, 27.32.

Example 2

A reaction similar to that described in Example 1 was carried out employing isoprene as the diene reactant. After reaction for a period of 24 hours the reaction product was analyzed and found to contain 82 wt. percent of the 1,4-adduct O,O'-diethyl-S-(3-methyl)-buten-1-yl dithiophosphate, distilling between 100–105° C. at 0.5 mm.

Example 3

A reaction similar to Example 1 was carried out utilizing 2,5-dimethyl-2,4-hexadiene as the diene reactant. After a reaction period of 72 hours the reaction product was analyzed and consisted of 85 wt. percent of the 1,2-monoadduct O,O'-diethyl-S-2-(2,5-dimethyl-4-hexen)-yl dithiophosphate, which could be distilled at 128–130° C. under 1 mm. pressure.

Example 4

In an experiment similar to Example 1, diisopropyldithiophosphoric acid was added to 1,3-butadiene. After a reaction period of 3 hours the reaction product was analyzed and consisted of 86% of the 1,4-adduct O,O'-diisopropyl-S-2-buten-1-yl dithiophosphate.

The product could be readily purified by fractional distillation in vacuo. It distilled over as a colorless liquid between 87–89° C. at 0.25 mm. pressure.

*Analysis.*—Calcd. for $C_{10}H_{21}O_2PS_2$ (percent): C, 44.75; H, 7.88; S, 23.89; P, 11.54. Found (percent): C, 45.04; H, 7.43; S, 25.80; P, 10.71.

Example 5

A mixture of 18.6 g. (0.1 mole) of diethyldithiophosphoric acid and 12 g. (0.3 mole) of allene were placed in a quartz pressure tube and reacted at 17° C. for a period of 24 hours under stirring and in the presence of ultraviolet light. The excess of unreacted allene was recovered by discharging it into a cooled trap. Fractional distillation of the raw product at 1 mm. pressure yielded 18.1 g. (80 wt. percent based on the acid) of the diethylallyldithiophosphate as a colorless liquid boiling between 70–72° C. Nuclear magnetic resonance and infrared absorption spectra of the product proved the assumed structure. The elemental composition of the distillate was also in agreemennt with the expected result.

*Analysis.*—Calcd. for $C_7H_{15}O_2PS_2$ (percent): C, 37.15; H, 6.68; O, 14.14; P, 13.69. Found (percent): C, 37.16; H, 6.51; O, 14.42; P, 13.52.

CATIONIC SYNTHESIS

Example 6

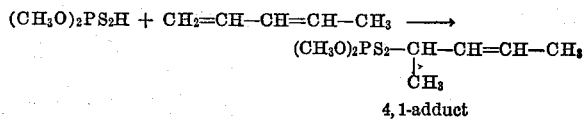

4,1-adduct

During a period of 20 minutes 47.6 g. (0.7 mole) of piperylene was added with magnetic stirring to 103.3 g. of 90% technical dimethyldithiophosphoric acid (equivalent to 0.6 mole). A spontaneous reaction was indicated by the rising temperature of the reaction mixture. After the reaction subsided the mixture was allowed to stand overnight. A nuclear magnetic resonance (N.M.R.) spectrum of a sample taken next day showed that the reaction was substantially complete. The N.M.R. has also indicated that 92% of the product formed was the 4,1-monoadduct, the expected compound from a cationic addition. A fractional distillation of the crude product yielded 110 g.

(81%) of the colorless liquid adduct, boiling between 80–84° C. at 0.1 mm. pressure.

*Analysis.*—Calcd. for $C_7H_{15}O_2PS_2$ (percent): C, 37.17; H, 6.68; S, 28.34. Found (percent): C, 36.69; H, 6.51; S, 29.14.

Example 7

To 37.2 g. (0.2 mole) of diethyldithiophosphoric acid, 13.6 g. (0.2 mole) of piperylene was added dropwise with stirring, nitrogenation and ice-water cooling. The mixture was then allowed to stand for 3 days at room temperature. Subsequent N.M.R. analysis indicated that 73% of the 4,1-monoadduct has been formed. This has been confirmed by fractional distillation, which resulted in 38 g. (75%) of a colorless liquid adduct boiling at 81–83° C. at 0.01 mm. N.M.R. showed that the distilled product consisted of about 90% of the 4,1- and 5% of the 1,4-adduct.

*Analysis.*—Calcd. for $C_9H_{19}O_2PS_2$ (percent): C, 42.50; H, 7.52; P, 12.17; S, 25.22. Found (percent): C, 42.47; H, 7.74; P, 10.98; S, 25.40.

Example 8

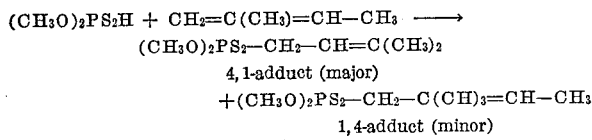

$(CH_3O)_2PS_2H + CH_2=C(CH_3)-CH=CH_3 \longrightarrow$
$(CH_3O)_2PS_2-CH_2-CH=C(CH_3)_2$
4,1-adduct (major)
$+(CH_3O)_2PS_2-CH_2-C(CH_3)_2-CH=CH-CH_3$
1,4-adduct (minor)

To 95.6 g. of ice-water cooled 90% dimethyl dithiophosphoric acid (0.55 mole), 43.6 g. (0.66 mole) isoprene was added slowly with stirring. After the ice melted, the mixture was allowed to stand for 2 hours at room temperature. A subsequent N.M.R. analysis of a sample indicated that no noticeable amount of the acid was left unconverted. N.M.R. also showed that the main product isomer, 63%, was the 4,1-monoadduct. A minor proportion 27%, of the 1,4-adduct was formed. Via fractional distillation of the crude, 110 g. (90%) of purified adduct was obtained as a colorless liquid boiling between 81–86° C. at 0.1 mm.

*Analysis.*—Calcd. for $C_7H_{15}O_2PS_2$ (percent): C, 37.17; H, 6.68; P, 13.68. Found (percent): C, 36.81; H, 6.70; P, 13.62.

Example 9

$(RO)_2PS_2H + CH_2=CCl-CH=CH_2 \longrightarrow$
$(RO)_2PS_2-CH_2-CCl=CH-CH_3$
1,4-adduct (major)
$+(RO)_2PS_2-CH_2-CH=CCl-CH_3$
4,1-adduct (minor)

To 0.25 mole distilled dialkyldithiophosphoric acid, 24.5 g. (0.275 mole) of chloroprene is added with stirring and running water cooling to moderate the exothermic reaction. After 24 hours, the extent of the addition reaction and the ratio of the isomeric monoadducts formed were estimated by N.M.R. spectroscopy. Then the crude products were fractionally distilled in vacuo. The data obtained are given in Table I. They show that the cationic additions provide the 1,4-monoadducts with high selectivity in good yields.

TABLE I

| Chloroprene adduct of dithiophosphoric acid $(RO)_2PS_2-CH_2-CCl=CH.CH_3$, R | Acid conversion after 24 hours, percent | Relative percent of adducts | | Yield of distilled adduct, percent | B.P. range of adduct isomers, ° C./mm. |
|---|---|---|---|---|---|
| | | 1,4- | 4,1- | | |
| Methyl | 100 | 87 | 13 | 82 | 80–82°/0.05 |
| Ethyl | 90 | 83 | 17 | 91 | 89–92°/0.05 |
| Isopropyl | 50 | 82 | 18 | 88 | 89–92°/0.01 |

Example 10

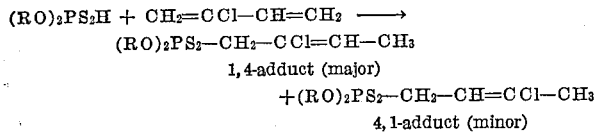

$(CH_3O)_2PS_2H + CH_2=CH-CH=CH_2 \longrightarrow$
$(CH_3O)_2PS_2-CH_2-CH=CH-CH_3 + (CH_3O)_2PS_2-CH-CH=CH_2$
$\phantom{(CH_3O)_2PS_2-CH_2-CH=CH-CH_3 + (CH_3O)_2PS_2-}\;\;|$
$\phantom{(CH_3O)_2PS_2-CH_2-CH=CH-CH_3 + (CH_3O)_2PS_2-}CH_3$
1,4-adduct (major)      2,1-adduct (minor)

A mixture of 126.4 (0.8 mole) of crude dimethyl dithiophosphoric acid (of 82% acid content) and 43.2 g. (0.8 mole) of butadiene was heated in a Pyrex-pressure tube in a 60° C. bath with magnetic stirring for 10 hours. The crude product formed was then sampled for N.M.R. spectroscopy which indicated a minimum of 90% conversion of the acid and a 9 to 1 ratio of the isomeric, 1,4- and 2,1-adducts. The unreacted butadiene was flashed off. The residual liquid product (165 g.) was dissolved in ether (300 ml.) and washed twice with 100 ml. 5% aqueous sodium hydrogen carbonate solution to remove any unreacted acid. The ether solution was then concentrated at 40° C. under 25 mm pressure yield 151 g. of a neutral product. The latter was fractionally distilled in vacuo to yield 135 g. (80%) of monoadduct, as a colorless liquid distilling at 77–79° at 0.2 mm. N.M.R. indicated that the adduct was composed of about 94% of the 1,4- and 6% of the 2,1-adduct.

*Analysis.*—Calcd. for $C_6H_{13}O_2PS_2$ (percent): C, 33.95; H, 6.17; P, 14.59. Found (percent): C, 33.98; H, 6.21; P, 14.43.

PESTICIDAL ACTIVITY

Example 11

Nematocidal tests.—*Meloidogyne* sp. nematodes were reared in tomato plant-soil medium. Soil for test purposes was inoculated with infected soil and root knots from infected tomato plants. The samples were blended thoroughly with the soil in a V-shell blender. Four one-pint paper pots were used for each treatment with one tomato transplant per pot. After three to four weeks under artificial light and overhead irrigation, the roots of the plants were examined for degree of root knot formation. Inoculated controls normally have about 50–100 root knots per plant. Percent control is determined by a comparison of the knot counts on treated and untreated tomato plants.

A summary of the test results is given in Table II.

TABLE II

| Exp. designation: | Structure of S-allyl dithiophosphate | Control of nematodes, percent by 100 lbs. per 4 in. acre |
|---|---|---|
| A | $(CH_3O)_2PS_2CH_2CH=CHCH_3$ | 100 |
| A | $(C_2H_5O)_2PS_2CH_2CH=CHCH_3$ | 90 |
| A | $(i-C_3H_7O)_2PS_2CH_2CH=CHCH_3$ | 0 |
| A | $[(CH_3)_2CHCH_2O]_2PS_2CH_2CH=CHCH_3$ | 0 |
| B | $(CH_3O)_2PS_2CH_2CH=CH_2$ | 100 |
| B | $(C_2H_5O)_2PS_2CH_2CH=CH_2$ | 30 |
| B | $(i-C_3H_7O)_2PS_2CH_2CH=CH_2$ | 0 |
| B | $[(CH_3)_2CHCH_2O]_2PS_2CH_2CH=CH_2$ | 0 |
| C | $(CH_3O)_2PS_2CH_2C(CH_3)=CHCH_3$ | 100 |
| C | $(C_2H_5O)_2PS_2CH_2C(CH_3)=CHCH_3$ | 0 |
| D | $(CH_3O)_2PS_2CH_2C(Cl)=CHCH_3$ | 100 |
| D | $(C_2H_5O)_2PS_2CH_2C(Cl)=CHCH_3$ | 50 |

The test results indicate that the S-allyl lower dialkyl dithiophosphates are active nematocides. It should be noted that regardless of the substitution of the allyl group, the dimethyl dithiophosphates are the most active. S-allylic dipropyl and higher dialkyl dithiophosphates have no significant nematocidal activity. Methyl and chloro substituents on the allyl group (see series of compounds designated A, C, and D, respectively) had no adverse effect on the activity.

Example 12

Insecticidal and miticidal tests.—A 0.1 g. sample of the dithiophosphate was dissolved in 0.5 ml. of acetone and the resulting solution was emulsified in an appropriate volume of water with help of Triton X–100 emulsifier.

In the Mexican bean beetle tests lima bean leaves, sprayed on the dorsal and ventral surfaces, were offered to ten larvae of the Mexican bean beetle (late second instar) for a forty-eight hour period. Mortality data were recorded thereafter.

In the pea aphid tests, adult pea aphids were sprayed and transferred to sprayed pea plants and held for forty-eight hour mortality determinations. Foliage injury, if any, was recorded.

Systemic insecticidal activity was evaluated by applying 20 ml. spray of the sample to the vermiculite substratum of potted pea plants. Forty-eight hours after application, the plants were infested with ten adult pea aphids and mortality determination was made after five days.

In the spider mite tests, lima bean plants were infested with fifty to one hundred adults of the strawberry spider mite, Tetranychus altanticus, prior to testing. The infested plants were dipped into the test material and held for five days. Adult mortality as well as ovicidal action was noted.

In the mosquito larvicidal tests, the samples were dissolved in acetone and dispersed in water with the aid of Triton X–100. Fourth instar mosquito larvae were exposed to different concentrations in 200 ml. volumes of the formulations with an exposure period of 24 hours. Mortalities were recorded by the use of the Apparatus for Insecticide Assay, Hasset et al., 1960, J. Econ. Entomol. 53 (3) 483, to determine the median lethal concentrations.

The results of the tests are shown in Table III.

Example 13

Toxicity Tests on Warm Blooded Animals

In the mice and rat acute oral toxicity tests, corn oil solutions of the dithiophosphates were administered as a single dose through a stomach tube syringe. Five adult male animals were used for each rate of application. Observations were made on the animals for a two week period.

In the case of the S-crotyl dimethyl dithiophosphate, a median lethal dose, i.e., $LD_{50}$ of 1750 m./kg. for mice and an $LD_{50}$ of 680 m./kg' for rats, were obtained. For the S-crotyl diethyl dithiophosphate on mice, the $LD_{50}$ was found to be approximately 50 mg./kg.

In the rat inhalation test, twenty rats inhaled for one hour air containing 2 mg. per liter S-crotyl dimethyl dithiophosphate without toxic effects other than lachrymation and sneezing for five days.

In the rabbit dermal test, a single dose of S-crotyl dimethyl dithiophosphate was applied on the skin of the experimental animals. The median lethal concentration was found to be greater than 3180 mg./kg.

In the rabbit eye test, 0.1 ml. of S-crotyl dimethyl dithiophosphate was applied into the eye of a 2 kg. rabbit without any serious toxic effects. A minimal irritation of the eye was observed for 48 hours. Thereafter, no toxic effect could be observed whatsoever.

Example 14

Lubricating Oil Additive Tests

Allylic dithiophosphates were tested for activity as a lubricating oil additive and compared with other dialkyl-dithiophosphoric acid adducts including a zinc salt of a mixture of isobutyl and n-amyl dithiophosphoric acids as shown in Table IV. In each instance, the composition was prepared by mixing a small amount of the additive (0.1 wt. percent based on phosphorus) with a major portion of a mineral lubricating oil. The mineral lubricating oil employed in the tests was S.A.E. 30 Grade 100 V.I. oil.

In the oxidation stability test, the oil was aerated at 207° C. (340±1° F.) for 23 hours in the presence of silver and copper-lead specimens attached to a shaft spun at a rate of 600 r.p.m. The extent of oxidation was measured by the increase of the viscosity of the oil. The corrosivity of the oxidized oil appears as a weight change in the metallic specimens. After 3 and 19 hours, these

TABLE III

| | | Mortality of insects and mites | | | | |
| --- | --- | --- | --- | --- | --- | --- |
| Structure of S-allyl dithiophosphate | Concentration of insecticide and miticide, percent wt./vol. | Mexican bean beetles, 48 hrs. | Pea aphids | | Spider mites, 5 days | Larvicidal $LD_{50}$, percent mosquito larvae |
| | | | Contract, 48 hrs. | Systematic, 5 days | | |
| $(CH_3O)_2PS_2CH_2CH=CHCH_3$ | 0.05 | 0 | 100 | 100 | 61 | 0.00005 |
| $(C_2H_5O)_2PS_2CH_2CH=CHCH_3$ | 0.05 | 80 | 90 | 100 | 90 | 0.00005 |
| $(C_3H_7O)_2PS_2CH_2CH=CHCH_3$ | 0.20 | 0 | 40 | 0 | 0 | |
| $(CH_3)_2CHCH_2PS_2CH_2CH=CHCH_3$ | 0.20 | 20 | 20 | 0 | 0 | |
| $(CH_3O)_2PS_2CH_2CH(CH_3)=CHCH_3$ | 0.05 | 50 | 50 | 100 | 13 | |
| $(C_2H_5O)_2PS_2CH_2CH(CH_3)=CHCH_3$ | 0.05 | 10 | 70 | 70 | | |
| $(CH_3O)_2PS_2CH_2CH(Cl)=CHCH_3$ | 0.05 | 100 | 100 | 0 | 0 | 0.00010 |
| $(C_2H_5O)_2PS_2CH_2C(Cl)=CHCH_3$ | 0.05 | 0 | 60 | 0 | 0 | |
| $(CH_3O)_2PS_2CH_2CH=CH_2$ | 0.20 | 0 | 0 | 100 | 0 | 0.00150 |
| $(C_2H_5O)_2PS_2CH_2CH=CH_2$ | 0.20 | 0 | 50 | 60 | 59 | |
| $(C_3H_7O)_2PS_2CH_2CH=CH_2$ | 0.20 | 0 | 0 | 0 | 0 | |
| $[(CH_3)_2CHCH_2O]_2PS_2CH_2CH=CH_2$ | 0.20 | 0 | 30 | 0 | 0 | |

The data of Table III show that the S-allyl lower dialkyl dithiophosphates are active insecticides and miticides. The S-allylic dimethyl and diethyl dithiophosphates show comparable effectiveness while the diisopropyl and diisobutyl derivatives are much less effective. Substitution of hydrogens on the allyl group apparently had no adverse effect on the activity in any significant way. Neither did chlorine substitution adversely affect the contact insecticidal activity. It did result, however, in lowering the systemic activity.

specimens were replaced by new ones; consequently, the weight losses refer to the three intermediate periods between the start of the experiment and 23 hours.

The viscosity data shown in Table IV indicate that the allylic dithiophosphates have antioxidant activities comparable to the activity of the zinc dialkyl dithiophosphate. With regard to the corrosion of copper-lead bearing, it is interesting to observe that the chlorocrotyl dimethyl dithiophosphate containing oil attacked the alloy more than the more stable chlorocrotyl diisopropyl dithiophosphate.

*The 4-ball wear test*, [H. L. West, J. Inst. Petr. 32, 210, 222 (1946)] was used for the characterization of hydrodynamic lubrication of steel surfaces by the oil. In the test, three steel balls were placed in a fixed triangle position and a fourth was mounted above them. The fourth ball was mounted in a chuck so that the assemly could be rotated under pressure while lubricated with the oil to be tested. The tests were carried out at a rotational speed of 1800 r.p.m. under 10 kg. pressure at 150° C. for 30 minutes. Then the balls were microscopically examined for scar diameters which are, of course, directly proportional to the wear.

The results of Table IV show that S-crotyl diisopropyl dithiophosphate is only slightly inferior to the zinc dialkyldithiophosphate while S-chlorocrotyl diisopropyl dithiophosphate is equivalent to the zinc salt.

*In the regular extreme pressure test*, "Load Bearing Capacity SAE," Federal Test Method 6501.02 (15.15. 1955), two lubricated metallic surfaces were turned over each other at a rate of 1000 r.p.m. with 3.4/1 rubbing ratio under increasing pressure until seizure occurred.

The data of Table IV show that the various allylic dithiophophates examined are superior in this test to zinc dialkyldithiophosphate.

A further advantage of the allylic dithiophosphates over the zinc dialkyl dithiophosphates in oil additive applications is that they are metal free. This results in less ash and, consequently, less deposits from their use.

What is claimed is:

1. A method of combatting nematodes, comprising applying to said nematodes, a composition containing as the active ingredient a nematocidally effective amount of a compound having the formula:

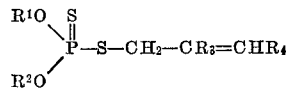

wherein $R^1$ and $R^2$ are either ethyl or methyl; $R_3$ is hydrogen, methyl or chlorine and $R_4$ is either hydrogen or methyl, in admixture with an inert nematocidal carrier therefor.

2. A method according to claim 1 wherein the active ingredient is O,O'-diethyl-S-2-butene-1-yl dithiophosphate.

3. A method according to claim 1 wherein the active ingredient is O,O'-dimethyl-S-2-methyl-butene-1-yl dithiophosphate.

4. A method according to claim 1 wherein the active ingredient is O,O'-dimethyl-S-2-chloro-butene-1-yl dithiophosphate.

5. A method according to claim 1 wherein the active ingredient is O,O'-diethyl-2-chloro-2-butene-1-yl dithiophosphate.

6. A method according to claim 1 wherein the active ingredient is O,O'-dimethyl-S-2-butene-1-yl dithiophosphate.

TABLE IV

| Structure of S-allyl dithiophosphate | Additive concentration, percent, P | Kinematic viscosity, Saybolt, sec. | | | Weight loss of silver, Mg | | | Weight loss of Cu/Pb bearing, Mg | | | 4 ball wear test, scar diameter, microns | Extreme pressure test, max. pressure lbs. |
|---|---|---|---|---|---|---|---|---|---|---|---|---|
| | | Initial | 19 hrs. | 23 hrs. | 3 hrs. | 19 hrs. | 23 hrs. | 3 hrs. | 19 hrs. | 23 hrs. | | |
| (Base oil) | Nil | 148 | 305 | 381 | −1 | −1 | −2 | +1 | −285 | −309 | 0.407 | 1,100 |
| (Zinc dialkyl dithiophosphate) | 0.1 | 149 | 159 | 161 | −4 | −187 | −1 | 0 | +5 | −16 | 0.266 | 1,600 |
| [(CH₃)₂CHO]₂PS₂CH₂CH=CHCH₃ | 0.1 | 149 | 160 | 165 | +11 | −23 | 0 | +9 | +20 | −69 | 0.313 | 2,000 |
| (CH₃O)₂PS₂CH₂C(Cl)=CHCH₃ | 0.1 | 146 | 163 | 174 | −1 | +2 | 0 | +3 | +9 | −89 | 0.330 | 3,250 |
| (C₂H₅O)₂PS₂CH₂C(Cl)=CHCH₃ | 0.1 | 145 | 160 | 161 | −1 | −3 | 0 | −1 | +50 | −31 | 0.360 | 3,150 |
| [(CH₃)₂CHO]₂PS₂CH₂C(Cl)=CHCH₃ | 0.1 | 146 | 158 | 160 | +11 | −76 | +1 | +26 | +38 | +34 | 0.264 | 2,960 |

References Cited

UNITED STATES PATENTS 3,021,352  2/1962  Miller _____ 424—219
3,340,332  9/1967  Oswald et al. _____ 260—956

ALBERT T. MEYERS, Primary Examiner

V. D. TURNER, Assistant Examiner

U.S. Cl. X.R.

252—46.6, 46.7